United States Patent Office 3,279,933
Patented Oct. 18, 1966

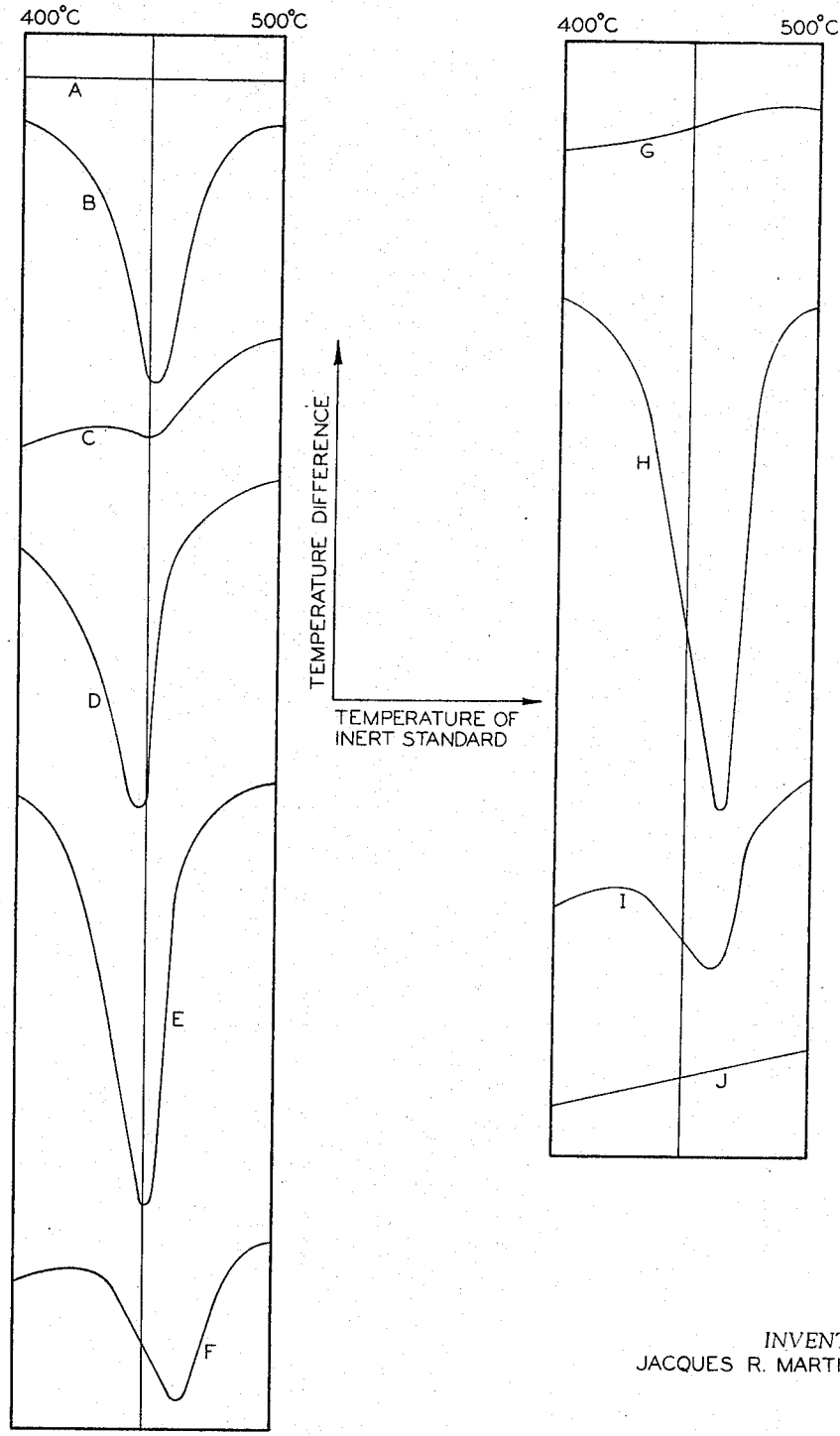

3,279,933
REFRACTORY
Jacques R. Martinet, San Jose, Calif., assignor to Kaiser Aluminum & Chemical Corporation, Oakland, Calif., a corporation of Delaware
Filed Mar. 9, 1964, Ser. No. 350,202
9 Claims. (Cl. 106—58)

This invention concerns refractories and particularly cementing or bonding refractory compositions.

One of the problems which has been encountered in the use of refractories in lining furnaces, especially high temperature metallurgical furnaces, when such refractories contain magnesia, for example in the form of periclase or calcined magnesite, is that when such magnesia bearing refractories are mixed with water prior to ramming, casting, tamping, and the like, a portion of the magnesia will hydrate to form magnesium hydroxide. When such refractories are heated up, e.g. during the period of bringing a furnace lining made of such refractories to operating temperature, the magnesium hydroxide decomposes. The decomposition of $Mg(OH)_2$ and consequent evolution of water vapor tends to cause the refractories containing them to explode violently.

It has hitherto been proposed to reduce this tendency towards hydration of magnesia-containing refractories by addition to such refractories of a small amount, for example 1% of the weight of the periclase or magnesia in the refractory batch, of a material which will form or yield $B_2O_3$ upon decomposition, for example boric acid, $H_3BO_3$. However, it has been found that when the refractory composition contains magnesium sulfate or a magnesium sulfate yielding material, the addition of boric acid in the conventional amounts is not only ineffective in preventing hydration but actually greatly increases the amount of hydration under certain conditions, as set forth hereinafter.

According to the present invention, an improved bonding or cementitious composition is provided which consists essentially of finely divided deadburned magnesia, from 0.5 to 5.0% by weight magnesium sulfate, or a material adapted to yield that amount of magnesium sulfate, and a boron compound adapted to yield $B_2O_3$ upon firing, the boron compound being added in such amount as to provide a weight ratio of $MgSO_4$ to $B_2O_3$ of less than 4:1 and preferably about 2:1 or less. In order to maintain best refractoriness, the weight ratio of $MgSO_4$ to $B_2O_3$ is not less than 1:4 and preferably not less than 1:2.

The bonding composition of this invention is useful as a mortar, for instance, but it is especially useful in refractory batches for forming bricks or other shaped objects, or in ramming, casting, or gunning mixes. There can be incorporated in such batches any desired compatible refractory grain materials, especially non-acid or basic materials such as periclase, deadburned magnesite, chromite, spinels, or suitable mixtures of such grains with each other. Preferably the bonding composition is used in an amount from 10% to 60% by weight of the total refractory composition.

The finely divided magnesia will all pass a 35 mesh screen and preferably passes a 100 mesh screen.

A preferred material for use as the magnesium sulfate yielding material is hydrated magnesium sulfate, $$MgSO_4 \cdot H_2O$$

for example the mineral kieserite. Other materials which can be used are Epsom salts, $MgSO_4 \cdot 7H_2O$, and sulfuric acid. Thus, when the dry composition is mixed with water, there will be a reaction between the magnesium sulfate and the finely divided magnesium oxide to form a Sorel type cement, as is well understood in the art. The term "magnesium sulfate yielding materials" is intended to include not only magnesium sulfate, but also materials which will yield magnesium sulfate upon reaction with magnesium oxide. Thus, for example, sulfuric acid can be added to a periclase containing refractory batch and the reaction between the sulfuric acid and the MgO will produce magnesium sulfate which, in turn, will react with further MgO in the refractory batch to form the cementitious Sorel cement.

The boron hydration-inhibiting material can be any material which will yield $B_2O_3$ upon firing. A preferred material is boric acid. Other useful materials are borax, sodium borate, pyroboric acid, pyroborates, and the like. It is preferred that the $B_2O_3$-yielding material be at least slightly soluble in water.

The advantage of compositions according to this invention is demonstrated by differential thermal analysis curves of the various compositions listed in Table I.

In a differential thermal analysis or DTA, the temperature difference between a specimen under test and a standard, inert specimen which undergoes no thermal effects over the temperature range of the test is measured with both specimens in a furnace which is heated at a constant rate of temperature increase. The results are plotted showing the temperature difference, in ° C. for example, as ordinate, against the temperature of the center of the inert standard as abscissa. When temperature effects, either endothermic or exothermic, occur in the test specimen, its temperature will lag behind or rise faster than that of the standard specimen and the differential temperature or temperature difference between the two specimens will be other than zero. Thus, in the case of magnesium hydroxide, which loses its water of hydration between 400° and 500° C., a specimen containing significant portions of this hydroxide will show a lag in temperature, and a consequent dip in the DTA curve, when heated through this temperature range, due to the release of $H_2O$ according to the reaction $Mg(OH)_2 \rightarrow MgO + H_2O$. In the case of a specimen containing magnesium hydroxide, for example, the magnitude of this dip or DTA peak is related to the amount of magnesium hydroxide in the specimen undergoing decomposition. In other words, a large heat effect or dip in the DTA curve indicates a relatively large amount of hydrated magnesia in the specimen, whereas a small dip or heat effect indicates a small amount of magnesium hydroxide in the specimen. Thus for MgO-containing specimens subjected to standard preparation and storage techniques, the magnitude of the DTA peak indicates the relative amount of hydration which has taken place.

The single figure of the drawing shows DTA curves in the region from 400 to 500° C. for the different compositions of Table I, the letter designations of the curves corresponding to the specimen designations in the table. The test specimens were placed in a ¼" diameter by ⅜" deep hole in a nickel block placed in the center of an electric resistance tube furnace. The inert standard, $Al_2O_3$, was placed in a similar hole in the same block.

TABLE I

| Specimen | $MgSO_4$ (weight percent) | $B_2O_3$ (weight percent) | $MgSO_4/B_2O_3$ Weight Ratio |
|---|---|---|---|
| A | none | none | |
| B | none | none | |
| C | none | 0.564 | |
| D | 4.46 | none | |
| E | 4.46 | 0.564 | 7.90 |
| F | 4.46 | 1.13 | 3.94 |
| G | 4.46 | 1.69 | 2.64 |
| H | 2.15 | 0.423 | 5.08 |
| I | 2.15 | 0.846 | 2.54 |
| J | 2.15 | 1.13 | 1.90 |
| X | 0.892 | 0.451 | 1.98 |
| Y | 0.892 | none | |

Curve A is for a dry, completely unhydrated periclase grain all passing a 100 mesh screen and containing about 98% MgO, the remainder being impurities. As can be seen, there is no heat effect over the temperature range from 400 to 500° C., indicating no magnesium hydroxide in the specimen. Compositions B through J in Table I were mixed with 10% $H_2O$, allowed to sit for ¼ hour at room temperature, and dried at 110° C. before being tested in the DTA apparatus. Curve B is for periclase without any additions, other than the water, and shows a pronounced dip in the curve, indicating substantial hydration of the material. Curve C indicates the effect of the addition of 1% boric acid to this periclase grain, the great reduction in the dip in the DTA curve indicating a large reduction in the amount of hydration when boric acid is added. Composition D is one containing periclase and 5% kieserite as bonding material, while composition E has periclase, 5% kieserite, and 1% boric acid. Curve E shows an extremely sharp dip in the DTA curve, indicating that the degree of hydration of this material is greater even than that of the periclase grain to which no additions have been made (Curve B) or that of periclase with kieserite alone (Curve D). The remaining curves of the figure indicate the relative amounts of hydration for different amounts of boric acid and kieserite as indicated in Table I. From these curves and the data given in Table I, it can be seen that only when the weight ratio of $MgSO_4:B_2O_3$ is less than about 4:1 is the hydration of the kieserite-containing periclase compositions less than that of the periclase with no additions or with kieserite alone and that the least hydration occurs when the ratio is not more than about 2:1.

As an example of the practical application of this invention, two compositions were made with 100 parts by weight of high purity periclase grain containing 98% MgO, remainder impurities, and one part by weight kieserite bonding agent. The periclase grain all passed a 4 mesh screen and 25% passed a 100 mesh screen. To the first of these batches (X in Table I) 0.8 part by weight boric acid was added, while no boron addition was made to the second batch (Y in Table I). Both batches were mixed with water in the amount of 6% of the weight of the dry ingredients and cast into molds to form blocks or cubes about 12" on a side. A thermocouple was embedded in the center of each block. After both blocks had hardened, they were heated in a furnace at the rate of about 100° C. per hour. The block without boron addition exploded when the thermocouple embedded in it read about 450° C., whereas the other block was heated to above 500° C., without rupture.

Thus it is apparent that by the compositions of this invention, it is possible to produce periclase-containing refractory compositions containing magnesium sulfate bonding material which show superior hydration resistance to that of prior art compositions.

In the specification and claims, percentages and parts are by weight of the dry ingredients, unless otherwise indicated. Analyses of mineral components are reported in the usual manner, expressed as simple oxides, e.g., $MgO$, $SiO_2$, although the components may actually be present in various combinations, e.g., as a magnesium silicate. Mesh sizes referred to herein are Tyler Standard Screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns, and that passing 200 mesh, to 74 microns.

Having now described this invention, what is claimed is:

1. A cementitious composition consisting essentially of finely divided magnesia, an amount of magnesium sulfate yielding material to yield from 0.5% to 5% of the weight of the composition of $MgSO_4$, and a $B_2O_3$ yielding material in such amount that the weight ratio of $MgSO_4$ to $B_2O_3$ is less than 4:1 and greater than 1:4.

2. A cementitious composition consisting essentially of magnesia, passing a 35 mesh screen, an amount of magnesium sulfate yielding material to yield from 0.5% to 5% of the weight of the composition of $MgSO_4$, and a $B_2O_3$ yielding material in such amount that the weight ratio of $MgSO_4$ to $B_2O_3$ is from 1:2 to 2:1.

3. A cementitious composition consisting essentially of magnesia passing a 100 mesh screen, an amount of magnesium sulfate yielding material to yield from 0.5% to 5% of the weight of the composition of $MgSO_4$, and a $B_2O_3$ yielding material in such amount that the weight ratio of $MgSO_4$ to $B_2O_3$ is about 2:1.

4. A refractory batch consisting essentially of refractory grains containing at least 10% by weight finely divided magnesia, sufficient magnesium sulfate yielding material to yield from 0.5% to 5% of the weight of the finely divided magnesia of magnesium sulfate, and a $B_2O_3$ yielding material in such amount that the weight ratio of $MgSO_4$ to $B_2O_3$ in the batch is less than 4:1 and greater than 1:4.

5. A refractory batch consisting essentially of refractory grains containing at least 10% by weight magnesia particles passing a 35 mesh screen, sufficient magnesium sulfate yielding material to yield from 0.5% to 5% of the weight of the magnesia particles passing a 35 mesh screen of magnesium sulfate, and $B_2O_3$ yielding material in such amount that the weight ratio of $MgSO_4$ to $B_2O_3$ is from 1:2 to 2:1.

6. A refractory batch consisting essentially of refractory grains containing at least 10% by weight magnesia particles passing a 100 mesh screen, sufficient magnesium sulfate yielding material to yield from 0.5% to 5% of the weight of the magnesia particles passing a 100 mesh screen of magnesium sulfate, and a $B_2O_3$ yielding material in such amount that the weight ratio of $MgSO_4$ to $B_2O_3$ is about 2:1.

7. A refractory batch consisting essentially of periclase grain at least 10% of which passes a 35 mesh screen, kieserite to yield from 0.5% to 5% by weight of the periclase passing a 35 mesh screen of $MgSO_4$, and boric acid, the weight ratio of $MgSO_4$ to $B_2O_3$ in the composition being less than 4:1 and greater than 1:4.

8. A refractory batch consisting essentially of periclase grain at least 10% of which passes a 100 mesh screen, kieserite to yield from 0.5% to 5% by weight of the periclase passing a 100 mesh screen of $MgSO_4$, and boric acid, the weight ratio of $MgSO_4$ to $B_2O_3$ in the composition being about 2:1.

9. A refractory composition consisting essentially of one part by weight kieserite, 0.8 part by weight boric acid, and 100 parts by weight periclase grain, 25% of which passes a 100 mesh screen.

References Cited by the Examiner

UNITED STATES PATENTS

| | | | |
|---|---|---|---|
| 2,999,759 | 9/1961 | Heuer | 106—58 |
| 3,030,217 | 4/1962 | Chantler et al. | 106—59 |

TOBIAS E. LEVOW, *Primary Examiner.*

J. E. POER, *Assistant Examiner.*